US00RE41618E

(19) United States
(12) Reissued Patent
Florschuetz

(10) Patent Number: US RE41,618 E
(45) Date of Reissued Patent: Aug. 31, 2010

(54) METHOD AND SYSTEM OF AUTOMATIC BANDWIDTH DETECTION

(75) Inventor: Alan S. Florschuetz, Allen, TX (US)

(73) Assignee: Yahoo! Inc., Sunnyvale, CA (US)

(21) Appl. No.: 11/592,318

(22) Filed: Nov. 2, 2006

Related U.S. Patent Documents

Reissue of:
(64) Patent No.: 6,813,580
Issued: Nov. 2, 2004
Appl. No.: 10/462,349
Filed: Jun. 16, 2003

U.S. Applications:
(63) Continuation of application No. 09/903,888, filed on Jul. 12, 2001, now Pat. No. 6,601,009.

(51) Int. Cl.
*G06F 15/16* (2006.01)
G06F 13/00

(52) U.S. Cl. ..... 702/124; 702/76; 702/178; 702/187; 709/217; 709/231

(58) Field of Classification Search ..... 702/124, 702/76, 79, 122
See application file for complete search history.

(56) References Cited

U.S. PATENT DOCUMENTS 5,918,002 A 6/1999 Klemets et al. ..... 455/7
5,970,052 A * 10/1999 Lo et al. ..... 370/241
6,085,241 A * 7/2000 Otis ..... 709/223
6,256,669 B1 * 7/2001 Hurwitz ..... 709/224
6,272,539 B1 * 8/2001 Cuomo et al. ..... 709/223
6,292,834 B1 * 9/2001 Ravi et al. ..... 709/233
6,385,673 B1 * 5/2002 DeMoney ..... 710/60
6,397,258 B1 * 5/2002 Tsuji et al. ..... 709/233
6,587,875 B1 * 7/2003 Ogus ..... 709/223
6,628,666 B1 * 9/2003 Pickering et al. ..... 370/468
6,766,376 B2 * 7/2004 Price ..... 709/231
2001/0010059 A1 * 7/2001 Burman et al. ..... 709/224
2001/0044835 A1 * 11/2001 Schober et al. ..... 709/217
2002/0116518 A1 8/2002 Silen et al. ..... 709/231

* cited by examiner

*Primary Examiner*—Hal D Wachsman
(74) *Attorney, Agent, or Firm*—James J. DeCarlo; Greenberg, Traurig, LLP

(57) ABSTRACT

A method for measuring a bandwidth of a signal path between a data source and a data recipient involves sending a block of test data from the data source along the signal path to the data recipient, using that test data to obtain a measured bandwidth of the signal path, and transferring information from the data source along the signal path to the data recipient in accordance with the measured bandwidth. The measured bandwidth value can be calculated each time the data recipient accesses a website or the measured bandwidth value can be retained for future use.

19 Claims, 2 Drawing Sheets

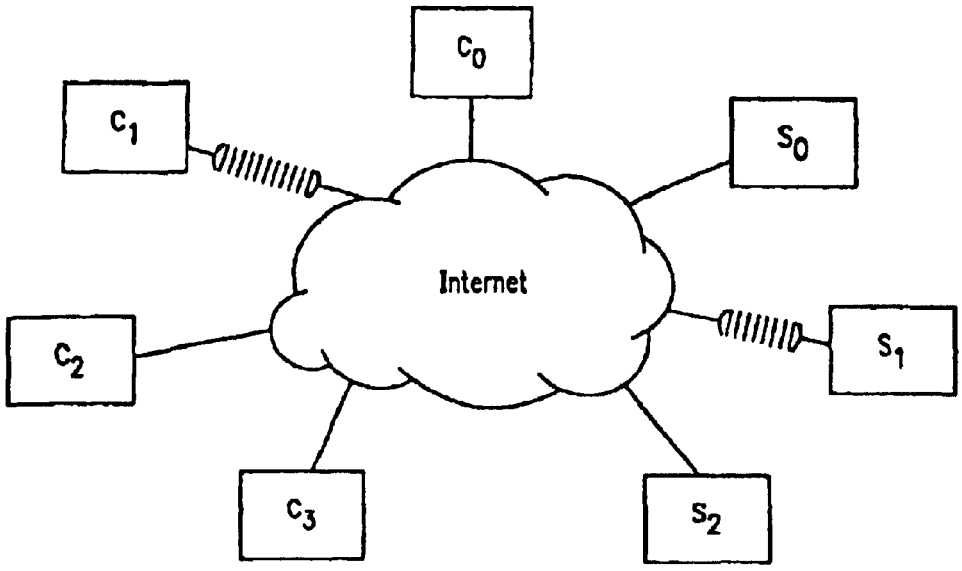
FIG. 1 - PRIOR ART
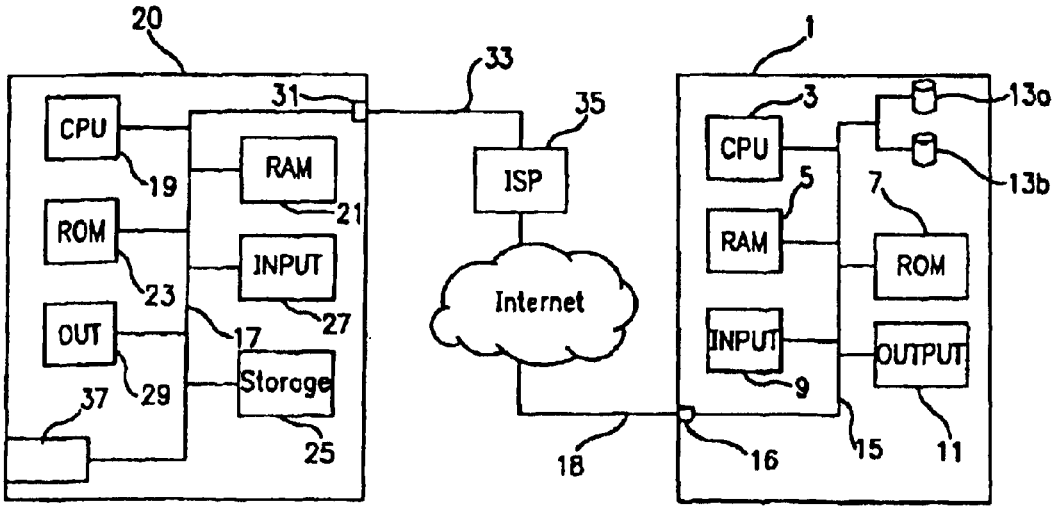
FIG. 2 PRIOR ART

METHOD AND SYSTEM OF AUTOMATIC BANDWIDTH DETECTION

Matter enclosed in heavy brackets [ ] appears in the original patent but forms no part of this reissue specification; matter printed in italics indicates the additions made by reissue.

CROSS-REFERENCE TO RELATED APPLICATION

This application is a *reissue of U.S. Pat. No. 6,813,580, which issued from U.S. patent application Ser. No. 10/462, 349 filed on Jun. 16, 2003, which is a* continuation of U.S. patent application Ser. No. 09/903,888, filed on Jul. 12, 2001, now U.S. Pat. No. 6,601,009.

FIELD OF THE INVENTION

The present invention is directed to the transmission of data between computers, and, more particularly, to a method of controlling the supply of streaming media sent from a server to a client over the Internet.

BACKGROUND OF THE INVENTION

With the continuing expansion of the Internet the transfer of data between different computers over the Internet is becoming ever more widespread. Computers today exchange data over the Internet using a variety of different types of connections. Connections such as T-1 and T-3 lines, cable modems, and DSL have high data transfer rates, typically on the order of 100–1000 Kbits/sec., and are referred to as high bandwidth or broadband connections. Connections such as telephony modems have lower data transfer rates, typically on the order of 15–56 Kbits/sec., and are characterized as low bandwidth connections. Bandwidth is important because it affects to the amount of data which can be passed between computers over the Internet. The term "data" is used broadly and, by way of example, refers to any type of information that can be transmitted over the Internet, such as numbers, text, images, sounds and computer programs.

FIG. 1 is a schematic view showing a number of client computers $C_0$, $C_1$, $C_2$ and $C_3$ and server computers $S_0$, $S_1$ and $S_2$ all connected to the Internet. Client $C_1$ and server $S_1$, it should be noted, are joined to the Internet by wireless connections.

Data sent over the Internet may vary in size greatly, depending upon the nature of the data which is sent. One particularly bulky type of data is streaming media data. The term "streaming media" refers to audio, video or audio-video data with or without text that has a chronological component and which is therefore played over time. Streaming media data is typically transferred from a content provider to a user. When this transfer takes place over a network, the content provider uses a server computer having the appropriate server software to respond to requests for data, and the user employs a computer having the appropriate client software to send requests for data and receive and process responses to those requests.

Users typically exchange data over the Internet using Internet browser software. Browsers are capable of displaying a wide variety of different file formats that are commonly sent over the Internet, such as TIFF, JPG, HTML, TXT, WAV and so forth. Examples of browsers include NETSCAPE NAVIGATOR® by Netscape Corporation and INTERNET EXPLORER® by Microsoft Corporation. Since the operation of browser software is generally known, such operation will not be described in detail.

In some instances, a browser may be unable to display the data sent by a content provider's server because that data is in an unsupported file format. In that case the browser may require a supplemental "plug-in" program to display the data. Such plug-in programs can be written as Java applets or ActiveX controls. A wide range of different types of plug-in programs are known.

One type of data that generally cannot be displayed by a browser is streaming media data. When receiving streaming media data a browser will call up a particular type of plug-in program known as a media player to process and display such data. The media player cooperates with the browser and displays the streaming media data as that data accumulates in a buffer in the user's client computer. Typically, the browser program calls up the media player plug-in, which in turn calls the objects that drive the media player, as downloading of the streaming media data from the content provider's server computer to the user's client computer begins.

Examples of media player programs include QUICKTIME® by APPLE COMPUTER, INC.®, REALPLAYER® by REALNETWORKS®, and Windows Media Player by Microsoft Corporation.

Streaming media can be sent over the Internet using UDP (User Datagram Protocol). According to UDP, packets of compressed audiovisual data are sent from the content provider to the user over the Internet without verification that all packets have been received. By avoiding such verification data transfer is speeded. The data packets are stored at the user's computer in a buffer until the buffer fills, at which point the media player program begins playing the media. Data packets continue to be delivered to the buffer as the media plays, hence the name "streaming". In this way, the media player begins playback before all of the streaming media data is received, and can continue playback until the buffer runs out of data.

Preferably, the content provider's server sends the user streaming media data in a form which is optimal for the bandwidth of the user's Internet connection. If the bandwidth of the user's connection is high, the server can send detailed streaming media data, resulting in a large, lifelike and smooth display. If the bandwidth is low, less data should be sent, resulting in a smaller and lower-quality image.

Included with the streaming media data sent by the content provider's server to the user may be information instructing the user's computer how to configure the media player to display the streaming media data. That is, high resolution streaming media data may be accompanied by an instruction to the user's computer to display the streaming media in a large media player window. Low resolution streaming media data may be accompanied by an instruction to the user's computer to display the streaming media in a small media player window.

For good playback quality the streaming media data should be supplied to the media player at least as quickly as the media player can display that data. If the media player display the streaming media data faster than such data is received, the data buffer will empty, after which jerking, skipping and poor quality playback will occur. This is a particular problem for users having low bandwidth Internet connections; the low bandwidth connections mean users either will receive low-quality displays, or, since their computers may not receive fresh streaming media data fast enough for proper display, may experience jerking and skipping of the program being played. It is therefore very important that the content provider send to the user streaming media data of the appropriate type and at the correct rate. This can be done in a number of ways, for example, by reducing the size of the displayed image, decreasing the image's frame rate (frame rate refers to the number of times per second that the displayed image changes), and decreasing the quality of the accompanying audio playback.

Thus, when sending streaming media data from a content provider's server to a user's client, it is preferable that the server know the bandwidth of the user's Internet connection. This way the content provider can send data to the user at the appropriate rate, and in the appropriate format (i.e., resolutions and size).

Although this problem can to some extent be solved by having the content provider's server send streaming media data with the assumption all users have low bandwidth connections, this would disadvantageously reduce the quality of the playback for those users having high bandwidth connections.

Another solution to this problem is to control the quality of streaming media playback according to the known bandwidth of the user's Internet connection; users having high bandwidth Internet connections would receive higher resolution data than users having low bandwidth Internet connections. To do this, websites distributing streaming media content may wait to send streaming media data until the user has indicated the bandwidth of their Internet connection. This way, streaming media data appropriate for the bandwidth of the user's Internet connection can be sent. One way to accomplish this is to place on the appropriate web page at the content provider's website different hyperlinks corresponding to different possible Internet connection bandwidths. Each hyperlink, when activated ("clicked") sends information to the content provider about the user's bandwidth, and may be accompanied by a request to transfer to the user's computer specific resolution streaming media data. For example, users might be offered a choice of two different high bandwidth connections speeds, i.e., 300 Kbps and 100 Kbps, and two different low bandwidth connection speeds, i.e., 56 Kbps and 28.8 Kbps. Each hyperlink would, when activated, inform the content provider of the user's bandwidth so that the content provider's server can send to the user streaming media data with a resolution appropriate for the indicated Internet connection's bandwidth. Alternatively, the user might first indicate their bandwidth and then be given a choice of media to download from the content provider.

Optionally, the content provider's server could set a cookie on the user's computer defining the bandwidth of the user's Internet connection. By setting this cookie the user need not again indicate the bandwidth of their Internet connection with they return to the site.

Nevertheless, such manual selection of streaming media by the user according to the bandwidth of the user's connection has several disadvantages. First, this requires the user to take action, which slows the user's browsing experience. Second, the user may select the wrong link; should the user inadvertently choose a link for a lower bandwidth connection than is appropriate, the user will see a lower quality image that necessary. If the user selects a link for a higher bandwidth connection than is optimal, the user's computer may not be able to receive streaming media data at that rate. In such a case, the lack of data could cause playback to skip and jerk. In addition, if the user refuses to allow a cookie reflecting the bandwidth of the user's Internet connection to be set, or the user has deleted such a cookie, the user, when returning to the website, will again have to choose the appropriate download link when they return to the site and attempt to download streaming media content. Each of these actions can contribute to user frustration, which may adversely affect site viewership.

SUMMARY OF THE INVENTION

The present invention is directed to a system for controlling the transmission of data from a content provider to a user over the Internet based upon the bandwidth of the user's connection to the Internet.

More particularly, this invention measures the bandwidth of a user's Internet connection each time a user requests data such as streaming media data from a content provider and, having measured the bandwidth of the user's connection to the Internet, sends the user the data in a form optimized for the measured bandwidth.

In a further embodiment, this invention determines the bandwidth of the user's Internet connection when the user first visits a content provider's site. The content provider then stores information regarding the determined bandwidth and that stored information is used so that the user is sent data optimized for the measured bandwidth. The stored information can be used only for the immediate session only, for a predetermined period of time, or even in separate sessions. By using the stored information the content provider avoids the need to again measure the bandwidth of the user's Internet connection.

The present invention involves a method for measuring the bandwidth of a signal path between a data source and a data recipient. This can be done by sending a block of test data from the data source along the signal path to the data recipient, using that test data to measure the time needed to transfer that data, and so obtain a measured bandwidth of the signal path. Streaming media data or other information is then transferred from the data source along the signal path to the data recipient based upon the measured bandwidth. If desired, the bandwidth can be measured each time the data recipient visits the website or the bandwidth can be stored for future use. The signal path can include the Internet and the information may be streaming media data.

A further and optional aspect of this invention involves determining whether the measured time falls within a range and only if the measured time falls within that range is the measured time used to determine a measured bandwidth of the signal path. If the measured time is below the range, a different block of test data is sent along the signal path to obtain a further measured bandwidth and transfer of information takes place in accordance with the further measured bandwidth. Should the measured time exceed the range, use of the measured time to determine the bandwidth of the signal path is delayed.

Additionally, in an alternate embodiment, this invention includes detecting whether the signal path's bandwidth was previously determined. If that bandwidth already was determined and is available then the known bandwidth value is used, instead of measuring the bandwidth anew.

BRIEF DESCRIPTION OF THE DRAWINGS

The present invention will now be described with reference to the accompanying drawing figures, which are merely illustrative, and wherein like reference characters denote similar elements throughout the several views. In these drawings:

FIG. 1 depicts as prior art a number of different computers connected via the Internet;

FIG. 2 is a detailed schematic diagram showing as prior art components of both client and server computers connected through the Internet;

DETAILED DESCRIPTION OF THE PRESENTLY PREFERRED EMBODIMENTS

Figure 3:
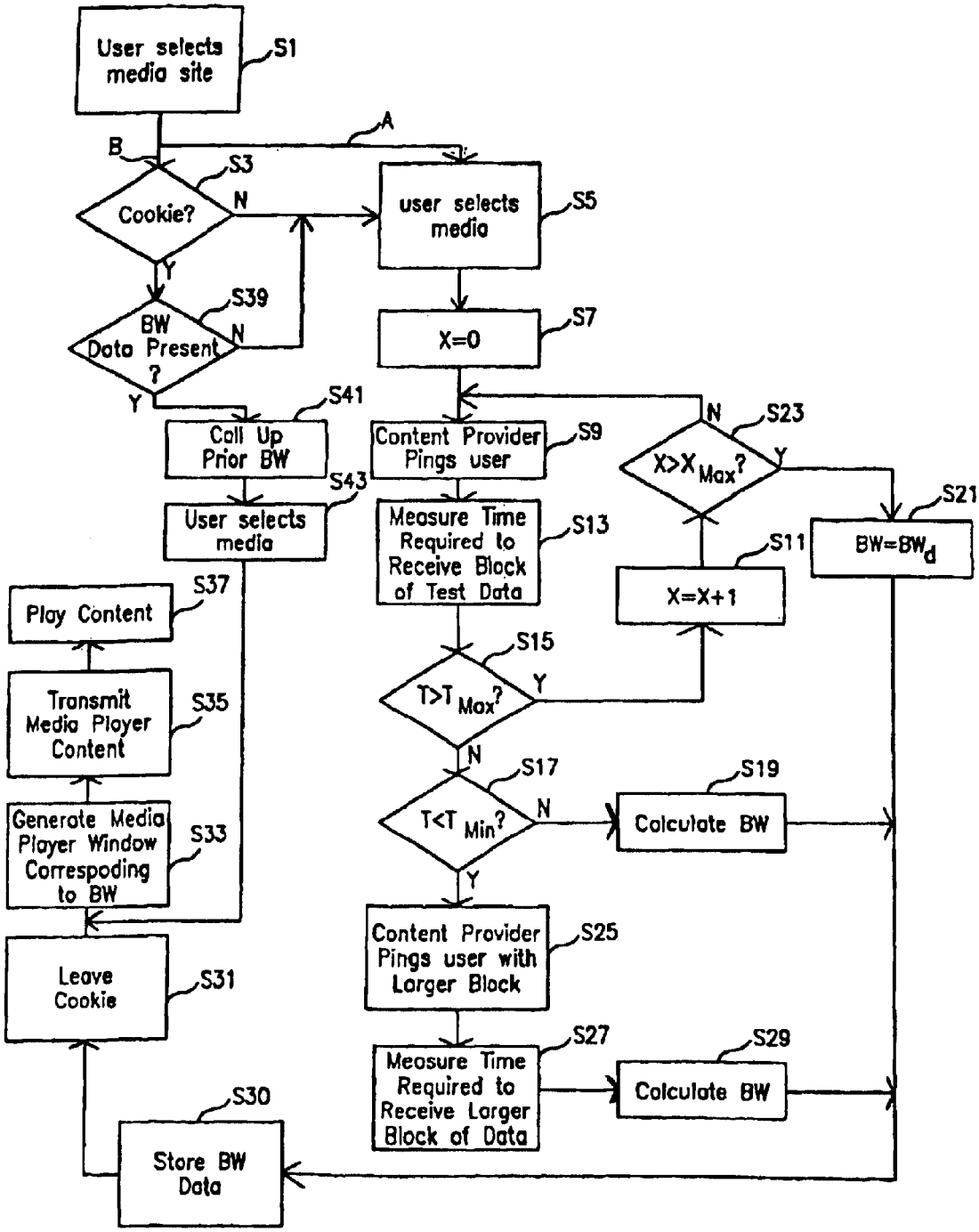
FIG. 3 is a flowchart illustrating the exchange of data between client and server computers in accordance with the present invention.

The present invention is directed to methods of controlling and displaying data, in particular, streaming media data, using an Internet browser interface. More specifically, the present invention relates to the transmission of streaming data from a server computer to a client computer over the Internet, and to the measurement and characterization of client's Internet connection. This enables the content provider to send streaming media data to the user in the appropriate manner for the bandwidth of the user's Internet connection. As explained in greater detail below, this can be achieved by automatically sending a block of test data from the content provider to the user.

Once the bandwidth of the user's Internet connection is measured, the content provider's server can send the requested data to the user along with information establishing the format of the media player window in which that data will appear. By way of non-limiting example, the information establishing the format of the media player window can be sent, before the streaming data, in a separate file containing information such as a stream ID number, a stream identifier relating to the format of the data that will be sent, the stream title, stream author, status and copyright information, the data transfer rate (i.e., bit rate), the file name, the duration of the streaming data, and an expiration. All or some of this data, and/or other data, could be included in the identifying file.

Next, server and client computers suitable for use with this invention will be described.

As depicted in FIG. 2, server 1 has a number of different components, each of which will be described hereafter, connected to a bus 15. Bus 15 serves to relay commands and data between various components.

Central processing unit (CPU) 3 serves to control the internal operation of the server. Read-only memory (ROM) 7 is a non-volatile memory device which stores programs and data used by the CPU 3 as the server 1 starts up. Random access memory (RAM) 5 is a memory device which contains programs and data used by the CPU 3 during routine operation of server 1. Commands from an operator (not shown) are sent to the server 1 through an input device 9, which could by way of non-limiting example be a keyboard or a pointing device such as a "mouse" or trackball. Server 1 displays information through output 11. Output 11 can, for example, be a video monitor or a printer. Operating program and data files can be stored on an operation drive 13a, and data to be sent out from the server 1 to users can be stored on a content drive 13b. Drives 13a and 13b are preferably magnetic disk drives. The use of different drives 13a and 13b to store the operating programs and data separate from the content data is thought to be preferable because it facilitates the simultaneous reading of such operating information and content data. Moreover, although FIG. 2 depicts the use of two separate drives 13a and 13b, additional drives also could be provided. Alternatively, a single drive could be used.

Various types of data can be stored on server 1 for transmission over the Internet to users. Such data could, by way of non-limiting example, take the form of HTML (hypertext mark-up language) web pages, images, text, programs, audio and video files. The server 1 can therefore function as a data source. The present invention is particularly applicable to the transfer of audio and video files, as will be described hereafter.

Server 1 has a data port 16 through which the server 1 can exchange data over the Internet with external computers such as client computer 20. By way of non-limiting example, the data port 16 could be a cable modem, telephony modem or network connection. Data port 16 is connected to the Internet by data line 18, which by way of non-limiting example could be a coaxial cable, a telephone line, or an optical fiber, or any type of such connector now known or hereafter developed. Data line 18 also could be a wireless connection such as a satellite link.

The present invention also could be adapted for use over any known or future developed networks other than the Internet. By way of non-limiting example, this invention could also be used over an Ethernet local area network.

In known fashion, server 1 has a unique IP (Internet protocol) address which identifies the server and distinguishes it from all other computers on the Internet.

Data is exchanged between server 1 and the Internet in accordance with pre-established protocols. Requests for data from users and the data sent in response can be exchanged using TCP/IP (Transmission Control Protocol/Internet Protocol), UDP (User Datagram Protocol), or other protocols.

Next, client computer 20 will be described with reference to FIG. 2.

Client computer 20 includes a bus 17 through which commands and data flow between the client computer's different components. Central processing unit (CPU) 19 controls internal operation of the client 20. Programs and data used by the CPU 19 during start-up are stored in a read-only memory (ROM) 23. ROM 23 is preferably a non-volatile memory device. A random access memory (RAM) 21 is another memory device and this device contains programs and data that are used by the CPU 3 during routine operation of client 20. Storage device 25, commonly a magnetic disk drive, contains programs and data used by the client 20 during operation. Such programs include client software which enables the client 20 to communicate with the server 1 over the Internet.

Commands are sent to the client 20 by an operator (not shown) using an input device 27, which could by way of non-limiting example be a keyboard or a pointing device such as a "mouse" or trackball. Output 29 is provided to display information from the client 20, and can, for example, be a video monitor or a printer. The information displayed may related to the operating status of the client 20 or be controlled by programs running on the client 20.

A removable storage device 37 can accept, read, and optionally record data on removable media (not shown). By way of non-limiting example, the removable media used by the removable storage device 37 could be a magnetic floppy disk, compact disc (CD) device, a digital video disc (DVD) or a memory card device. Also by way of non-limiting example, the removable storage device 37 can be used to load programs from removable media onto the client 30, or save programs and data from the client 20 onto removable media.

Client 20 can exchange data with external sources such as server 1 via a data port 31. Where data is to be exchanged over the Internet, data port 31, which by way of non-limiting example could be a cable modem, telephony modem or network connection, is connected to a data line 33, which by way of non-limiting example could be a coaxial cable, a telephone line, or an optical fiber. Data line 33 also could be a wireless connection such as a satellite link.

Client 20 exchanges data over the Internet through an Internet Service Provider ("ISP") 35. When client 20 receives data from an external data source, client 20 functions as a data recipient. Data passes over data line 33 between the ISP 35 and the data port 31. The ISP 35 is itself connected to the Internet in a known manner which need not be discussed herein.

In known fashion, server 1 has a unique IP (Internet protocol) address which identifies the server and distinguishes it from all other computers on the Internet.

Client 20 could, by way of example only, be a personal computer. Alternatively, the client 20 could be a remote terminal which is connected to a central mainframe computer, a WEBTV® unit, or an Internet appliance, a low-cost device which eliminates many of a computer's components, such as the hard disk drive.

As shown in FIG. 2, data can be sent from server 1 through data port 16 to data line 18. The data then passes through the Internet 22 to the ISP 35. ISP 35 sends the data to the client 20 over data line 33 to data port 31.

Since data transfer takes place over the Internet, data is transmitted between the server 1 and client 20 using Internet transfer protocols such as transfer control protocol and Internet protocol (TCP/IP). Such protocols are themselves known and need not be described in detail herein.

As will now be described in greater detail with reference to FIG. 3, the present invention checks at the content provider's side whether the bandwidth of the user's Internet connection already has been determined, and if not, tests that bandwidth. The streaming media data sent to the user is determined by the measured bandwidth.

In step S1 a user employs a browser to select and access a content provider's website. The content provider's website has at least one, and possibly many, hyperlinks ("links") to data streaming content. By way of non-limiting example, links to other forms of content such as plain text, still images and/or audio files, as well as to other websites, also may be provided on one or more pages. At least one of the content provider's web pages will contain one or more links which, when activated, send the content provider a request to download content to the user. Activating ("clicking") the hyperlink(s) to streaming media content will request the content provider's website to send data streaming content to the user.

As explained in detail hereafter, the present invention will automatically determine the bandwidth of the user's Internet connection, and control the supply of streaming media content accordingly. If this is the user's first visit to the content provider's website that information will be obtained, used and stored automatically. Should the user have visited the website previously, the desired information may already be available in the form of a cookie, which is a file stored on the user's client computer 20 to save information that can be used by the content provider's server computer 1. The creation and use of cookies is generally known and will not be described further.

The expression "activating a link" is used broadly and includes any manner of selecting a link so as to cause a suitable signal to be sent from the user's browser back to the link's source. By way of non-limiting example, this can be done using a mouse, trackball or keyboard, touch-sensitive display screen, or voice-activated software, or other components, in known fashion.

To assist a user in deciding whether to access streaming media content, the link(s) to that content is preferably either itself descriptive or is accompanied by an explanation of the content which can be accessed by following the link(s). For example, a link might read "click here to see an excerpt of a video showing the most recent World Series."

The term "cookie" is used in a broad sense, and by way of non-limiting example includes streaming media, video files, audio files, image files, text files and some combination thereof. The present invention is particularly suited to the transmission of streaming media data.

As previously noted, several different situations may exist with regard to the desired bandwidth: (1) regardless of whether the user has previously visited the content provider's site, bandwidth determination is conducted anew and so there is no inquiry whether the user has a cookie from a previous visit that might contain bandwidth-related information; (2) the user has never before visited the content provider's site, and so does not have a cookie with such information; (3) the user has visited the site previously but has not accepted a cookie; (5) although the user has visited the content provider's site and received a cookie, that cookie either has expired, does not contain information regarding the user's Internet connection bandwidth, or otherwise has been deleted; and (5) the user has previously visited the content provider's site and still has a cookie.

Each of these different situations will now be described, where appropriate, with reference to FIG. 3.

A user new to the content provider's site wishes to obtain content shown on the content provider's web page. To do this, the user in step S1 has his browser download web page data for the content provider's site, If the content provider wishes to measure the bandwidth of the user's Internet connection each time the user requests data from the content provider, it is not necessary to inquire whether the user has a cookie from a previous visit. As shown in FIG. 3, the cookie inquiry of step S3 is not performed; instead, processing moves along branch A to step S5, wherein the user selects the desired media. By using this scheme, the bandwidth of the user's Internet connection can be determined each time the user requests data from the content provider.

Alternatively, it may be desired to see if the bandwidth of the user's Internet connection was previously determined, for example, in response to a previous content request during the present session or during a previous visit to the content provider's site. In such cases information regarding the bandwidth of the user's Internet connection may be contained in a cookie on the user's computer. In this case, processing advances by branch B to step S3, where an inquiry is performed to determine whether the user's computer stores a cookie from the content provider's site.

Incidentally, a combination of these two approaches may be used. By way of non-limiting example, the content provider could immediately measure the bandwidth of the user's Internet connection at a predetermined time, such as the first time the user visits the content provider's site each hour/day/week/month, and then store that information using a cookie set on the user's computer. For a predetermined time thereafter, the content provider could look to the user's computer for the cookie containing information regarding the user's bandwidth. After that predetermined time, the bandwidth could be measured anew.

Returning to FIG. 3, if no cookie was found in step S3, processing advances to step S5, at which point the user selects the desired content in step S5 (discussion of processing if the cookie is found follows later). This can be done by choosing and activating the link corresponding to the content of interest. The desired link can be chosen and activated in known fashion using a suitable input device, such as a keyboard, mouse, trackball or other manual pointing device, or voice-recognition program. Activating the link sends a content request to the content provider's website, and the content provider responds to that content request by taking steps culminating in sending of the requested content back to the user. These steps will now be described in detail.

While the following discussion of the present invention assumes that bandwidth of the user's Internet connection is determined by the quality of the user's connection to his ISP, this invention also could be used where other factors affect the user's Internet connection bandwidth. For example, quality of the connection between the ISP and the Internet backbone, or in other segments of the path followed by the data being sent between the user and the content provider, might determine the bandwidth of the user's Internet connection.

Thus, the following discussion of the present invention, while it speaks of the user-ISP connection, also could be used where one or more of these other segments influences the bandwidth of the user's Internet connection.

Once the user new to the site has selected in step S5 the desired streaming media, the content provider's server will take steps to evaluate the bandwidth of the user's connection to the Internet. It will be appreciated that because generally the slowest part of the signal path leading from the user's client computer 20 to the content provider's server 1 over the Internet is the signal path from the client computer 20 to the ISP 35, only the bandwidth of that portion of the signal path need be measured. It should be kept in mind that before taking steps to measure that bandwidth, the content provider already has determined in step S3 that because no cookie was returned by the user's browser, such information is not available to the user's computer.

By way of exemplary general overview, this invention can simply transmit a test block of data to a user, or can include a subprocess which can wait, if necessary, for the cessation of transient Internet conditions that may interfere with the content provider's ability to judge the user's bandwidth.

Where a block of test data is simply transmitted, a 5K block of data can be sent to test the user's bandwidth (other size data blocks could be used). This can be done with or without comparison to an expected or maximum amount of time. If the 5K block of test data cannot be sent, then the connection is of such low bandwidth that the content provider cannot adequately interact with the user. In that case, a suitable error message could be sent.

In the foregoing approach, bandwidth could be calculated based upon the time that was required to transfer the block of test data. That value is used for comparison to determine the behavior of other functionality or to determine the user's ability to accept various streaming media speeds.

If the subprocess which waits for Internet conditions to improve is used, in order to limit the time spent waiting for those transient conditions to end, part of this subprocess also can involve checking to see that not more than a predetermined amount of time is spent waiting.

Another subprocess checks to see generally whether the user has a high speed Internet connection. This is done because it may be desirable to test the bandwidth of such a high speed using a more accurate test procedure.

If the subprocess which waits for Internet conditions to improve is to be used, the content provider begins the bandwidth determination procedure in step S7 by first setting to 0 the value X of a loop counter; if that subprocess is not used, step S7 can be omitted. As explained in greater detail below, this loop counter is used in the subprocess to limit the amount of time spent evaluating the user's bandwidth.

Next, the content provider "pings" (that is, sends to) the user in step S9 with a predetermined amount of data. By way of non-limiting example, a 50 Kbyte block of test data can be sent to the user's computer. The block of test data includes an instruction causing the user's computer to note and transmit back to the content provider the times that the first and last portions of the block of data are received (other schemes for measuring the time required for the complete receipt of the data block, such as measurement at the content provider's side, could be used). With this information the content provider can in step S13 measure how much time is required for the user to receive the 50 Kbyte block of data.

The optional subprocess for waiting to see if transient Internet delays clear may be used because in some instances the test block's transmission of test data to the user may be slowed not because of the user's own connection with the ISP, but rather, because of such transient delays elsewhere in the Internet. For example, congestion along the lines used to transmit data from the user's ISP to the Internet backbone will reduce the rate at which the ISP's customers can send and receive data. Traffic over the Internet's high-speed backbone also might delay the data being sent from the content provider to the user, or the user's computer might be running other programs such as anti-virus software at the same time as the browser, which other programs use sufficient system resources to slow the browser's receipt of data from the Internet.

Such a delay may be so substantial that it slows the transmission of the test block to the user to a rate less than that of even the slowest normal Internet connection. It can therefore be assumed that whenever the time needed to download the block of test data to the user exceeds the download time for the slowed expected connection ($T>T_{max}$), there is some other delay in the signal path. In other words, if it takes longer to transfer the block of test data than should be the case using the slowest modem in common use, it can be inferred that transient conditions exist somewhere along the data transfer path which unduly lengthen the time needed to transmit the entire block of data. Thus, if this subprocess is used, then in step S15 a check is made to see whether $T>T_{max}$ (if the subprocess is not used, step S15 can be omitted).

When the present invention detects such a delay, the bandwidth determination process is deferred and periodically repeated in the hope that the cause of the delay will abate. If the cause of the delay does not abate after a predetermined period of time, then a default bandwidth can be assumed.

More specifically, if in the initial bandwidth measurement process the measured download time determined in step S13 exceeds that for the slowest connection that could be expected ($T>T_{max}$), it can be inferred that there is a transient delay somewhere along the data path which is slowing data transfer ("Y" in step S15). In that case, the process flow could loop back to again ping the user, since by then the cause of the delay might have ended.

Such looping and pinging could continue indefinitely until the delay ends and the true data transfer time (now no greater than the expected maximum time) can be determined. Because this might halt the download of streaming media data to the user, it may be preferable to place a limit on the amount of time spent by the user waiting while the content provider tries to detect the data transfer time to that which is reasonable and which will not try the user's patience. If by the end of that limiting time the user's bandwidth still has not been measured, a default bandwidth $BW_d$ can be assigned in step S21. A default bandwidth of 28.8 Kbits/sec could be used, for example, this corresponding to the speed of the slowest expected telephony modems presently used.

As noted above, bandwidth could be determined on the basis of the amount of time taken to transfer the block of test data without waiting to see if the transient delay clears. In a further alternative embodiment, and as explained below, transient delay could be inferred after a period of time and suitable action taken.

The length of time after which transient delay can be inferred can be determined by assuming a minimum connection speed. If the time required to transmit the entire block of data exceeds the time which would be required to transmit the data at that minimum connection speed, transient delay can be inferred. By way of non-limiting example, if it is assumed that the user's minimum connection speed to the ISP is 28.8 Kbits/sec, then a 50 Kbyte block of data should not take more than approximately 13.8 seconds to be transmitted (50,000 Kbyte×8 bits/byte)/28,800 bits/second=13.8 sec.). Here, if more than about 14 seconds are required for the transmission of the entire block of data, transient delay can be inferred.

One benefit of this approach is that it keeps the user from becoming frustrated with waiting and leaving the content provider's website, even thought the user's bandwidth will not be determined accurately.

In summary, to implement this control option, the system ascertains in step S15 whether the elapsed time T is greater than the predetermined maximum time $T_{max}$, that predetermined maximum time reflecting a presumed minimum connection speed. If the elapsed time exceeds the predetermined maximum time $T_{max}$, processing continues enters a delay loop. Each time processing passes through the loop the incremental counter X is advanced by 1 in step S11. Again, it should be understood that this procedure of comparing to a predetermined value is optional, and could be omitted in favor of an intermediate determination of bandwidth in the manner already described.

To limit the time spent in this loop, in step S23 a check is made to see whether the counter value has reached a predetermined maximum value, $X_m$. If in step S23 it is determined that X exceeds $X_m$, processing moves to step S21, where a default value of $BW_d$ is assigned for bandwidth BW. It will be understood that the check in S23 is not needed where bandwidth is directly measured and the effect of any transient delay ignored.

If in step S23 it is found that X is less than $X_m$, then processing continues through the loop back to step S9, where pinging is performed, in the manner outlined above.

With continued reference to step S15, if it is determined in step S15 that the transmission time is less than the aforementioned presumed maximum time $T_{max}$, meaning there is not an external delay affecting the bandwidth of the user's Internet connection, processing advances to step S17.

In step S17 the measured transmission time T is compared to a minimum transmission time $T_{min}$. By way of non-limiting example, and as shown at step S17, this determination of a high bandwidth connection can be made by comparing the measured time T to reference time $T_{min}$, reference time $T_{min}$ having been chosen to correspond to the time required for a high bandwidth connection to transfer 50 Kbytes of data. This is done because as transmission time decreases, measurement errors may increase. In that case, it may be desirable to re-test the transmission time using a larger block of test data, as will be described later in greater detail. This scheme can be used for both the direct measurement of bandwidth and the alternative "looping and pinging" schemes.

If the measured transmission time T does not exceed the minimum time $T_{min}$ (in step S17, "N"), the process will continue to step S19, where the bandwidth corresponding to time T is determined using the time measured in step S13. One way to determine the bandwidth is to use the measured transmission time to calculate the bandwidth of the user's connection to the Internet according to the formula:

$$BW=D/T$$

where BW=bandwidth, D is the amount of test data sent (here, 50 Kbytes), and T is the amount of time required to completely send the test data to the user. While BW is here calculated in terms of Kbytes/second, BW can be converted to Kbits/second simply by multiplying the value of BW by the conversion factor of 8 bits/byte.

As an alternative to direct calculation of bandwidth, the bandwidth BW could be determined by using a look-up table correlating different measured times to different bandwidths values. The look-up table and the values contained therein can be generated in advance on the basis of actual measurements and/or theoretical calculations. Such numbers could vary according to the application involved (i.e., the nature of the streaming media data that is sent).

For example, the look-up table could contain a number of different measured time ranges forming the limits of several ranges ($T_a$–$T_b$), together with the associated bandwidth values, as shown in Table 1:

TABLE 1

| $T_a$ (sec) | $T_b$ (sec) | Bandwidth |
|---|---|---|
| 14.0 | 9 | 30 Kbits/sec |
| 9 | 5 | 60 Kbits/sec |
| 5 | 3 | 90 Kbits/sec |

These values are only provided by way of example and not limitation. More ranges, narrower ranges and/or other values could be employed.

As previously noted, a check is made in step S17 to see whether the user's Internet connection is a high bandwidth connection. When it is found in step S17 that time $T<T_{min}$, this means that the user's bandwidth is of at least a certain threshold speed, and so a further and more accurate test can be performed. Also by way of non-limiting example, means in the form of programmable circuitry (not shown) or software may be provided so that the value of the reference time $T_{min}$ could be changed. It may be helpful to be able to change the reference time because over time the average bandwidth increases as users upgrade their connections and higher bandwidth devices are prepared.

Taken together, steps S15 and S17 involve checking to see whether the measured time required to download the block of test data falls within the range $T_{min}$–$T_{max}$. Only if T falls within that range is the bandwidth immediately determined. If T is shorter than $T_{min}$ a more detailed bandwidth test is performed in step S25, while if T exceeds $T_{max}$ measurement is delayed for a period and, if necessary, a default bandwidth is presumed in step S21.

When the measured transmission time T is less than the minimum time $T_{min}$, a further measurement of transmission time is made in step S25 by pinging the user with a 500 Kbyte block of test data. The 500 Kbyte block of test data can be sent to the user in generally the same manner as the 50 Kbyte test block, and other amounts of data could be used. The time required for the complete transmission of this data is measured in step S27, and the bandwidth is calculated in step S29. The bandwidth can be calculated either using formula (1) or a suitable look-up table, or some other technique.

The bandwidth value determined in either of steps S19, S21 or S29 is then stored in step S30 for later use in controlling the transmission of data to the user's browser.

Optionally, a cookie, either persistent or session, containing information reflecting the user's measured bandwidth is set on the user's computer in step S31. Since the manner of setting a cookie is generally known, that operation will not be described in detail.

By setting this cookie in the user's computer, it will not be necessary to again determine the bandwidth of the user's connection the next time the user seeks to download data from the content provider, whether in the current session or, if the user leaves the content provider's site, the next time the user returns to that site. This way the time-consuming measurement procedures outlined above can be avoided. This aspect of the invention will be described in greater detail later on.

Having determined the bandwidth of the user's Internet connection and the available media player(s), the content provider in step S33 uses this information to send to the user's browser a call to open up a particular media player window. This can be done, by way of non-limiting example, by sending the information establishing the format of the media player window before the streaming data, in a separate file containing information such as a stream ID number, a stream identifier relating to the format of the data that will be sent, the stream title, stream author, status and copyright information, the data transfer rate (i.e., bit rate), the file name, the duration of the streaming data, and an expiration. All or some of this data, and/or other data, could be included in the identifying file.

If the user's computer does not have the correct type of media player for the data to be downloaded, the user's computer may in known manner give the user the option of downloading and installing the necessary media player.

Knowing the user's bandwidth allows the content provider's media player call to specify the proper size of the media player window to be opened (again, the size of the media player window will be influenced by the bandwidth of the user's Internet connection; faster connections allow for larger media player windows). By way of non-limiting example, the following media player window sizes could be used for the indicated bandwidths:

TABLE 2

| Bandwidth | Window Size |
|---|---|
| 28 K | 176 × 132 pixels |
| 56 K | 176 × 132 pixels |
| 100 K | 240 × 180 pixels |
| 300 K | 320 × 240 pixels |

The values proposed in Table 2 are proposed for a basic video window, and are suggested by way of non-limiting example. The window size may be altered if ActiveX controls are used.

This avoids degraded performance, which might otherwise occur where the user's bandwidth is insufficient to supply the needed amount of content data to the media player.

Once the user's computer has confirmed that the media player window has opened, the content provider then commences transmitting data to the media player in step S35. After sufficient data has been received by the user's computer, the media player begins playing in step S37.

It is presently preferred to evaluate the user's bandwidth each time the user visits the website. This is thought to be preferable because of the inconsistency in bandwidth today; a user may have high bandwidth on one visit, low bandwidth on another. This way, the streaming media data sent to the user is always tailored to reflect the user's bandwidth.

Alternatively, instead of detecting the user's bandwidth each time a user visits a website, a previously-determined bandwidth can be used.

In the case where a previously-determined bandwidth is to be used, as noted above with regard to step S3, the user seeking to download content from the content provider's site already has visited the content provider's site. In step S3 a check is made to see whether a cookie for the content provider's site was set on the user's computer during the previous visit. If the cookies has been set on the user's computer, the user's browser will in step S3 return that cookie to the content provider along with the user's initial request to be sent web page data to display that site. Upon receiving this cookie the content provider's website will recognize the user as a repeat visitor. Processing advances to step S39, where a check is made to see if bandwidth data is present in the cookie. If such data is available, the data is then read out in step S41 and stored at the content provider for use in selecting the format of streaming data sent to the user.

Having the previously-determined bandwidth data is useful because this information speeds the transmission of content to the user; now, it is not necessary to go through the various steps required to ascertain the user's bandwidth. Content transmission can instead begin immediately. The content to be downloaded from the content provider is selected by the user in step S43. Processing then advances to step S33, wherein the content provider uses that information to send to the user's browser a call to open up a media player window and thereafter play the content in a manner already described with regard to steps S35 and S37.

The content provider, having received the cookie, still may not in step S39 find bandwidth information for the user. Then, as shown in step S39 the content provider will take the steps already described with regard first to step S5 to determine the user's bandwidth.

It will be understood that various values given in the foregoing discussion of this invention are by way of example and not limitation. For instance, blocks of test data of sizes other than 50 Kbytes and 500K bytes, and other types of test data, could be used.

Likewise, while the foregoing discussion of this invention made reference to streaming media data, this present invention need not be limited to such data. Rather, the this can be employed whenever the size of data being transmitted is such that receipt of such data is a concern. For example, this invention might have applicability to a game site.

Nor is the present invention intended to be limited to the transmission of data over the Internet. This invention may have applicability in any network, such as a LAN, or other networks using other transmission protocols, where the amount of data transferred between points on the network affects applications running on members of the network.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A method for measuring a bandwidth of a signal path between a data source and a data recipient, comprising the steps of:

sending a block of test data from the data source along the signal path to the data recipient and measuring a time required for the *block of* test data to be transferred to the data recipient;

determining whether the measured time is at least a threshold value and, if the measured time is at least the threshold value, using the measured time to determine a measured bandwidth of the signal path; and transferring information from the data source along the signal path to the data recipient at a rate within the measured bandwidth;

setting the measured bandwidth to a default value if an amount of delay exceeds a predetermined time, and wherein, if the measured time is [at least] *less than* the threshold value, the using of the measured time to determine a measured bandwidth of the signal path is delayed.

2. A method for measuring a bandwidth of a signal path between a data source and a data recipient, comprising the steps of:

detecting whether the bandwidth of the signal path was previously determined;

if the bandwidth of the signal path was not previously determined, sending a block of test data from the data source along the signal path to the data recipient and measuring a time required for the *block of* test data to be transferred to the data recipient;

if the bandwidth of the signal path was *not* previously determined, determining whether the measured time is at least a *first* threshold value and, if the measured time is *not* at least the *first* threshold value, *determining whether the measured time is less than a second threshold value, and if the measured time is not less than the second threshold value,* using the measured time to determine a measured bandwidth of the signal path; and transferring information from the data source along the signal path to the data recipient at a rate within either the previously determined bandwidth or the measured bandwidth.

3. [A] *The* method according to claim 2, further comprising a step of:

setting the measured bandwidth to a default value if an amount of delay exceeds a predetermined time, and wherein, if the measured time is less than the *second* threshold value, the using of the measured time to determine a measured bandwidth of the signal path is delayed.

*4. The method according to claim 2, further comprising:*

*determining, using either the previously determined bandwidth or the measured bandwidth, information to size a window in which the information transferred to the data recipient is to be experienced.*

*5. The method according to claim 4, further comprising:*

*transmitting an open window command to the data recipient, the open window command including the determined window size information.*

*6. The method according to claim 5, wherein the open window command comprises a command to open a media player window, and the determined window size information comprises information to size the media player window.*

*7. The method according to claim 1, further comprising the steps of:*

*detecting whether the bandwidth of the signal path was previously determined;*

*in a case that the bandwidth of the signal path was previously determined, said method further comprising skipping said steps of sending, determining, and setting, and performing said step of transferring information from the data source along the signal path to the data recipient using the previously-determined bandwidth.*

*8. The method according to claim 1, further comprising:*

*determining, using the measured bandwidth, information to size a window in which the information transferred to the data recipient is to be experienced.*

*9. The method according to claim 8, further comprising:*

*transmitting an open window command to the data recipient, the open window command including the determined window size information.*

*10. The method according to claim 9, wherein the open window command comprises a command to open a media player window, and the determined window size information comprises information to size the media player window.*

*11. A method for measuring a bandwidth of a signal path between a data source and a data recipient, comprising the steps of:*

*sending a block of test data from the data source along the signal path to the data recipient and measuring a time required for the block of test data to be transferred to the data recipient;*

*determining whether the measured time is within a predetermined range defined by a minimum value and a maximum value and, if the measured time is within the predetermined range, using the measured time to determine a measured bandwidth of the signal path;*

*setting the measured bandwidth to a default value if an amount of delay exceeds a predetermined time, and*

*transferring information from the data source along the signal path to the data recipient at a rate within the measured bandwidth;*

*wherein, if the measured time is outside the predetermined range, the using of the measured time to determine a measured bandwidth of the signal path is delayed.*

*12. The method according to claim 11, further comprising:*

*if the measured time is less than the minimum value:*

*sending an other block of test data from the data source along the signal path to the data recipient and measuring a time required for the other block of test data to be transferred to the data recipient;*

*using the measured time for the other block of test data to determine a measured bandwidth of the signal path.*

*13. The method according to claim 11, further comprising:*

*if the measured time exceeds the maximum value:*

*sending an other block of test data from the data source along the signal path to the data recipient and measuring a time required for the other block of test data to be transferred to the data recipient;*

*determining whether the measured time for the other block of test data is within the predetermined range defined by the minimum and maximum values and, if the measured time for the other block of test data is within the predetermined range, using the measured time to determine a measured bandwidth of the signal path.*

*14. The method according to claim 13, wherein the steps of sending an other block of test data and determining whether the measured time for the other block of test data are performed if the amount of delay does not exceed a predetermined time.*

*15. The method according to claim 11, further comprising the steps of:*

*detecting whether the bandwidth of the signal path was previously determined;*

*in a case that the bandwidth of the signal path was previously determined, skipping said steps of sending, determining, and setting, and performing said step of transferring information from the data source along the signal path to the data recipient using the previously-determined bandwidth.*

*16. The method according to claim 11, further comprising:*

*determining, using the measured bandwidth, information to size a window in which the information transferred to the data recipient is to be experienced.*

*17. The method according to claim 16, further comprising:*

*transmitting an open window command to the data recipient, the open window command including the determined window size information.*

*18. The method according to claim 17, wherein the open window command comprises a command to open a media player window, and the determined window size information comprises information to size the media player window.*

*19. The method according to claim 16, wherein a window size corresponding to a first measured bandwidth is larger than a window size corresponding to a second measured bandwidth which is smaller than the first measured bandwidth.*

* * * * *